United States Patent

[11] 3,631,766

| [72] | Inventor | Hillebrand Johannes Josephus Kraakman<br>Emmasingel, Eindhoven, Netherlands |
|---|---|---|
| [21] | Appl. No. | 856,626 |
| [22] | Filed | Sept. 10, 1969 |
| [45] | Patented | Jan. 4, 1972 |
| [73] | Assignee | U.S. Philips Corporation<br>New York, N.Y. |
| [32] | Priority | Sept. 18, 1968 |
| [33] |  | Netherlands |
| [31] |  | 6813312 |

[54] LINEAR HYDROMOTOR
2 Claims, 4 Drawing Figs.

[52] U.S. Cl. .................................................. 92/162,
92/181, 308/5
[51] Int. Cl. .................................................. F01b 31/00,
F16j 1/00
[50] Field of Search .......................................... 308/5;
92/162, 181

[56] References Cited
UNITED STATES PATENTS
268,684  12/1882  Jones .......................... 92/162

| 1,057,643 | 4/1913 | Hewitt............... | 92/181 X |
| 2,623,501 | 12/1952 | Audemar............ | 92/162 |
| 2,833,602 | 5/1958 | Bayer................. | 92/162 X |
| 2,907,304 | 10/1959 | Macks................ | 308/5 X |
| 3,168,013 | 2/1965 | Williamson......... | 308/5 X |
| 3,319,534 | 5/1967 | Boonshaft........... | 92/162 |

FOREIGN PATENTS
1,298,869  6/1962  France ....................... 92/181

*Primary Examiner*—Martin P. Schwadron
*Assistant Examiner*—Irwin C. Cohen
*Attorney*—Frank R. Trifari ABSTRACT: A linear hydromotor consisting of a cylinder closed by covers at both ends in which a piston having two flat surfaces and one cylindrical surface is linearly movable, the piston being provided on at least one flat side with a piston rod extending in the axial direction and passed through the cover situated on the relative side of the cylinder so as to be linearly movable and sealed. The flat surfaces are subjected to the influence of a medium under pressure, and at least three hydrostatic bearings and an annular groove open to the atmosphere are regularly distributed along the cylindrical surface of the piston.

LINEAR HYDROMOTOR

The invention relates to a linear hydromotor which is to be understood to mean a device consisting of a cylindrical in which a piston having two flat surfaces and one cylindrical surface is linearly movable, said cylinder being closed at both ends by covers. The piston comprises at least on one flat side, a piston rod extending in the axial direction, which rod is hermetically sealed and is passed through the cover situated on the relative side of the cylinder so as to be linearly movable. The flat surfaces are subjected to the influence of a medium under pressure. Such a hydromotor, sometimes termed piston drive, is intended to convert energy supplied by the supply or exhaust of a medium under pressure, generally a liquid, for example, oil, into a force exerted on the piston rod which force may be used such as for controlling components of machine tools.

Problems which present themselves in constructing such hydromotors are inter alia the lubrication of those parts of the motor which must be capable of moving linearly relative to each other, so at the area of the bearings, as well as the sealing of the gap or gaps which occur between such components in which great differential pressures of the medium can often occur. Such a gap is present, for example between the piston and the cylinder wall and another gap is situated between the piston rod and the inner surface of the aperture in the cylinder cover through which the piston rod is passed. It can therefore be understood that the term "hermetically" as used here, does not exclude the presence of gaps in bearings, but does mean that the building up of a high pressure in the cylinder is possible.

It is common practice to maintain an oil film between the said components: the supply of oil is usually effected by the movement of the components themselves. It is also known that such gaps are sealed by means of cut-through, springy metal rings, so-called piston rings, or by means of closed rings of a more flexible material, for example, rubber, such as the so-called O-rings Such bearings exhibit the following drawback. In the stationary condition of the components the oil film may be locally interrupted, the stiffness of the bearing being comparatively low and the introduced friction comparatively large. The stiffness $k$ of the bearing is to be understood to mean the ratio of the increase of the load $w$, at right angles to the axis, to the decrease of the width $h$ of the gap in the direction of the load, so $K=dW:dh$. Moreover, the nature of the friction which occurs in such bearings, the so-called coulomb friction, involves that when the parts must be fixed in a given position, this position is very difficult to reproduce and that moreover secondary-effect phenomena may occur as a result of which the said position may show variations with time. It is to be noted that the term reproducibility is to be understood to mean deviations of less than 1 micron ($\mu$m.) for example, the value of the wavelength of visible light.

One of the objects of the invention is to provide a linear hydromotor which can be used in those cases in which very great accuracy is required, for example, in machine tools of optic precision.

According to the invention at least three hydrostatic bearings are regularly distributed along the cylindrical surface of the piston. A hydrostatic bearing is to be understood to mean herein a bearing consisting of two parts each showing a sliding surface between which a gap is present and along which the two parts can move relative to each other, a pressure chamber being recessed in one of the said surfaces to which chamber a medium, usually oil, can be supplied under pressure through a resistance to flow, the so-called prerestriction, which medium can flow away through the gap around the pressure chamber. Such a bearing has the property that when the load on the bearing increases and as a result of this tries to reduce the width of the gap, the medium will flow away out of the pressure chamber with greater difficulty, the pressure drop across the prerestriction will decrease and the pressure in the chamber will increase and will thus counteract the action of the increased load. In the case of an efficient choice of the dimensions of such a bearing and the value of the pressure of the medium the width of the gap need undergo only very small variations with variable load. A further favorable property of such bearings is that both sliding surfaces are always, even in the stationary condition, separated by a thin layer of the medium so that the width of the gap always substantially constant. Moreover, the drawbacks associated with the use of piston rings and similar sealing means are avoided. On the other hand, a certain quantity of medium will always flow laterally out of the bearings, however, this quantity can be recovered and be pumped back if desired.

THe minimum number of hydrostatic bearings is set at three so that the forces exerted on the piston by the bearings can compensate for each other and can ensure that the piston will be centered in the cylinder.

Generally, the surfaces of the two flat sides of the piston, which are under the influence of medium, will be unequal in area. When, for example, a piston rod is secured to one of these piston surfaces, the medium of this side will exert its influence over a smaller area than on the other side.

Preferably, that side of the cylinder having the smaller flat piston surface is under the influence of the medium, and communicates with a supply for the medium under pressure. The opposite side of the cylinder preferably has an outlet which can communicate either with the atmosphere or with a supply of the medium under pressure. As a result of the alternative communication, the piston can be moved forward or backward.

According to a further embodiment of the invention, the smaller flat piston surface area is half of the other. As a result, the piston will move in the forward and backward directions at the same speed. The required ratio of the areas can be obtained by making the inside diameter of the cylinder $\sqrt{2}$ times as large as the outside diameter of the piston rod.

According to a further embodiment of the invention, the prerestrictions of these hydrostatic bearings consist of narrow ducts recessed in the piston. The ducts communicate at one end with the pressure chambers and at the other end with that space of the cylinder which bounds the smaller piston surface. Actually, the medium in this space will usually have the highest pressure during operation of the hydromotor so that said medium can flow out of said space through the prerestrictions to the pressure chambers. The ducts recessed in the piston may be bores in the piston body as well as grooves in the cylindrical piston surface.

Furthermore, a circumferential groove is preferably provided in the cylindrical piston surface between the pressure chambers and the said smaller piston surface, which groove communicates with the atmosphere through further ducts. The term atmosphere is to be understood to mean herein a space, for example, a container, in which the medium is under a comparatively low pressure, for example, atmospheric pressure.

According to a preferred embodiment of the invention at least one hydrostatic bearing is also present along the inner surface of the aperture in the cylinder cover though which the piston rod is passed. This bearing is preferably constructed as a stepped bearing, which is to be understood to mean a bearing in which the inner surface of the aperture in the cylinder cover has such a profile that an annular gap is formed between said surface and the outer surface of the piston rod. The gap consists of two parts merging into each other, the first of which, which adjoins the interior of the cylinder, having a larger width and, measured in the direction of the axis of the cylinder, a larger length than the second part. In this manner the first part may serve as a prerestriction and as a pressure chamber.

When a linear hydromotor is used in machine tools, for example, in a lathe of optic precision, it is often desirable to ix the piston and the piston rod in a given position. This may be made possible by means of a clamp on the end of a piston rod projecting from the cylinder.

According to a preferred embodiment of the invention a close-fitting sleeve is provided in the cylinder adjoining an opening in a cylinder cover through which a piston rod is passed. The sleeve comprises at least one circumferential groove in the surface facing the piston rod near the inner end of the sleeve. The groove can be made to communicate, through a duct, with a space in which the medium can assume a lower pressure than the pressure of he medium around the sleeve. When this duct is closed, the pressure inside and outside the cylinder will be equal and the piston rod can slide through the sleeve. When the duct is opened, the medium in the gap within the sleeve will assume a lower pressure than outside the sleeve and the sleeve, will be clamped to the piston rod. The term "close fitting" is to be understood to mean a fit in which the sleeve, in the unloaded condition, (i.e., when the pressure of the medium inside and outside the sleeve is equal) does not prevent a movement of the piston rod.

A both ends of the surface facing the piston rod, the sleeve preferably comprises circumferential grooves which together communicate with the said duct. In this manner, with the duct open, the entire section of the gap between the ducts will rapidly assume a low pressure and be forced on the piston rod.

When the position of the linear hydromotor is fixed either by clamping the piston rod outside the cylinder, or by means inside the cylinder, there is the danger that a leak of the medium may occur. As a result, the pressure in front of and behind the piston will assume values which differ from those of the equilibrium condition. Unacceptable large axial forces might thereby occur on several components of the motor.

The resistances to flow of the prerestrictions of the hydrostatic bearings on the piston and those of the gaps around the pressure chambers of those bearings are therefore proportioned so that the pressure of the medium in the chambers becomes substantially equal to that of the medium behind the piston.

In connection with the difficulty in keeping the width of the gaps as constant as possible throughout the stroke of the piston so that the adjustment of the pressure of the medium in the chambers is substantially constant, a pressure-regulating mechanism may be incorporated in the piston in the form of an axially movable valve the position of which is mainly determined by two reference pressures. A first reference pressure will be substantially equal to the pressure of the medium in the chambers of the hydrostatic bearings, and a second reference pressure will be substantially equal to the pressure of the medium before the piston. The valve will check a flow aperture in a duct which extends from a groove provided in the cylindrical piston surface in the proximity of the pressure chambers between the latter and the front side of the piston to the atmosphere. This regulating mechanism can ensure that the pressure in the pressure chambers remains equal to the pressure behind the piston.

According to a further preferred embodiment of the invention a second groove is present on the other side of the pressure chambers in the cylindrical piston surface. This groove contains the medium which supplies the first reference pressure of the pressure-regulating mechanism The two surfaces of the valve which are exposed to the reference pressure are preferably proportional to the piston surfaces which are also exposed to said pressures.

In order to reduce the danger of the occurrence of mechanical stresses upon connecting the hydromotor to other elements, for example, a machine tool, the piston rod may be hollow and comprises a double universal joint one end of which is connected to the piston and the other end of which is situated near the end of the hollow piston rod. The movements of the piston can then be transferred to other machine tools by means of said universal joint without the hollow piston rod itself being influenced by the occurring forces. The universal joint preferably consists of a rod in which two pairs of slits are milled near each end, at right angles to the axis, in such a way that between each pair of slits only a thin flexible wall remains. The two walls present at each end of the rod are spaced 90° relative to each other.

The order that the invention may be readily carried into effect, two examples thereof will now be described in greater detail, by way of example, with reference to the accompanying drawings, in which.

Figure 1:
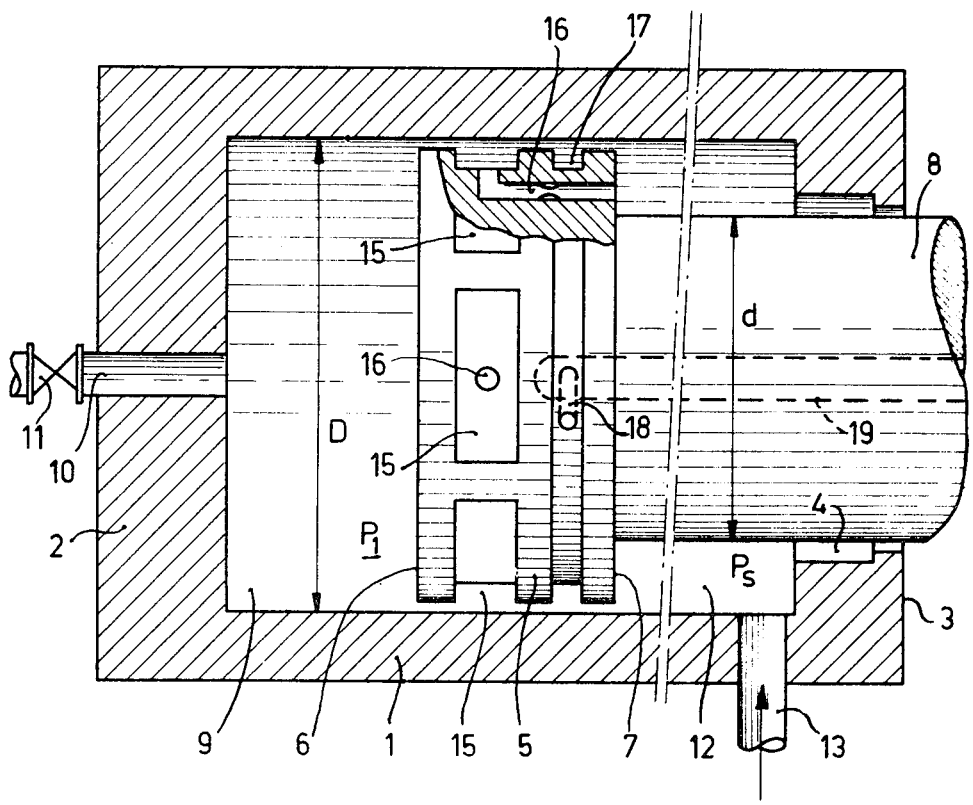
FIG. 1 is a diagrammatic cross-sectional view of first embodiment of a hydrometer according o the invention in which a part of the length is omitted.

In principle the hydromotor shown in FIG. 1 consists of a cylinder A which is closed on its rear side by a cover 2 and on its front side by a cover 3 in which an aperture 4 is provided. A piston 5 in the cylinder comprises a rear side 6 and a front side 7. To the latter a piston rod 8 is secured which can move through the aperture 4. On the rear side of the piston a chamber 9 is situated with which a duct 10 communicates in which a resistance to flow 11 diagrammatically denoted by a cross is incorporated. The front side of the piston comprises an annular space 12 around the piston rod 8. Through a duct 13, medium, for example, oil, under pressure can be supplied to the space 12 as is denoted by an arrow.

For practical reasons which will be explained below, the inside diameter D of the cylinder 1 and the outside diameter d of the piston rod 8 are in the proportion of $\sqrt{2}:1$, so that the medium so that the medium, hereinafter referred to simply as oil, in the chamber 12 influences a piston surface 7 which equals half of the piston surface 6 which bounds the chamber 9 . In the equilibrium condition, when the oil in the supply duct has a pressure equal to $P_s$, the oil on the rear side of the piston will have a pressure of $P_1=\frac{1}{2}P_s$. The said proportion of the piston surfaces, which otherwise is not essential, enables a movement of the piston either forwards (to the right in the drawing), or backwards (to the left in the drawing) at equal speeds in a simple manner. Actually, when the duct 10 is made to open into the atmosphere at a pressure $P_o=0$ and when the resistance to flow 11 has a value $R_3$, the quantity of oil displaced per second may be written as:

$$\theta = \frac{1}{2}P_s/R_3 = v\,\pi/4\,D^2,$$

wherein $v$ is the speed of the piston and $\frac{1}{2}P_s$ is the pressure of the oil in the chamber 9. When, however, the duct 10 is made to communicate with the oil supply duct in which a pressure $P_s$ prevails, then $$\theta = (P_s - \frac{1}{2}P_s)/R_3 = \frac{1}{2}P_s/R_3$$

which hence is the same value. In the first case the piston moves to the left, in the second case it moves to the right.

Along the circumference of the piston 5, four hydrostatic bearings are provided each having a pressure chamber 15 in the form of a recess in the cylindrical piston surface. The supply of oil under pressure, which is essential for the operation of said bearings, is obtained by communicating the chambers, through prerestrictions in the form of narrow ducts 16, with the space 12 in front of the piston 5. In addition to the chambers 15 the piston surface further comprises a groove 17 which communicates, through a radial bore 18 in the piston and an axial bore 19 in the piston rod 8 with the atmosphere where the pressure is $P_o$. The values of the resistances to flow of the prerestrictions would have to be proportioned so that they are equal to the average resistances to flow of the gaps between the pressure chambers 15 and the groove 17. In that case the drop of the oil pressure $P_s$ in the chamber 12 to the oil pressure $P_o$ in the bore 19 will be distributed evenly between said resistances to flow so that an average pressure $\frac{1}{2}P_s$ will equalize in the chambers. Since this is the pressure which prevails in the space 9 behind the piston, only a small quantity of oil will flow between the chambers 15 and the space 9. Of course, such oil displacements are undesirable because the quantity of oil in the space 9 determines the position of the piston. The movement of the piston must naturally first of all be controlled by the resistance to flow 11. However, the flow of oil out of the pressure chambers 15 to the space 9 has much more serious consequences in the case in which the piston rod would be fixed in a given position. Actually, the pressure behind the piston could deviate so much from the equilibrium value in this case that deformations or other damages could be the result. In practice it is also difficult to make the resistances to flow meet the above-mentioned condition because the resistance which the oil experiences upon flowing out of the pressure chambers depends upon the width of the gap between the piston and the cylinder at that area and said width can substantially not be made constant. The resistance of the prerestrictions 16 is therefore preferably made larger but at the same time a pressure-regulating mechanism is incorporated in the piston which may ensure that the pressure in the chambers 15 obtains substantially the correct value. The operation of this pressure-regulating mechanism will be explained with reference to FIGS. 2 and 3.

Figure 2:
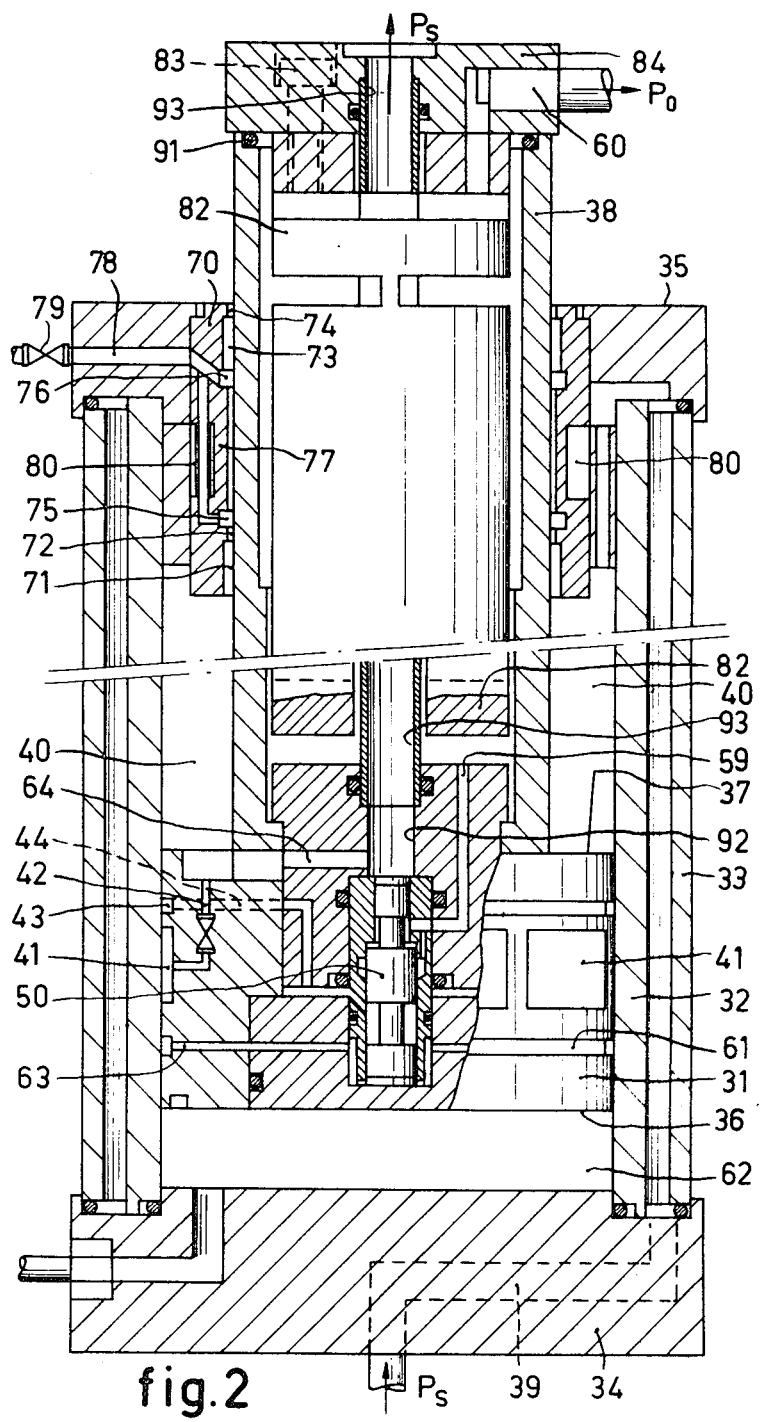
FIG. 2 is a detailed cross-sectional view of a second embodiment, likewise shortened.

The linear hydromotor shown in FIG. 2 consists of a piston 31 and a cylinder which is composed of two coaxial tube sections 32 and 33. The cylinder is closed by a rear cover 34 and a front cover 35. These covers are forced on the cylinder by means of ties (not shown) extending in the axial direction. The piston comprises a front side surfaces 37 and a rear side surface 36 to the former of which a hollow piston rod 38 is secured. For structural reasons the piston is composed of several components which are of no essential importance for understanding the invention and which will not be described.

Figure 3:
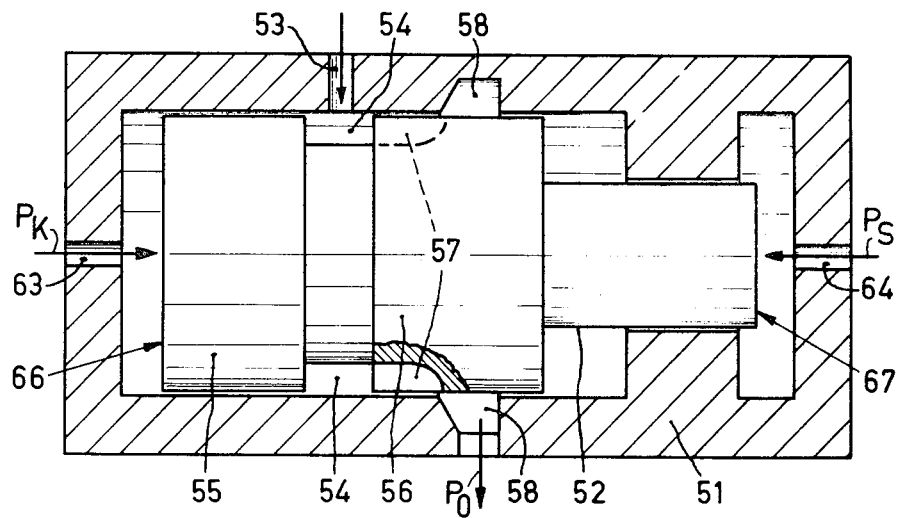
FIG. 3 is a diagrammatic cross-sectional view of the pressure-regulating mechanism used in said hydromotor.

Oil under a pressure $P_s$ can flow through a duct 39 drilled in the cylinder cover 34 via the space between the tube sections 32 and 33 which constitute the cylinder to near the front cover 35 and then to the space 40 in the cylinder in front of the piston 31. It is to be noted that the construction of the cylinder wall shown has been chosen to consist of two concentric tube sections so as to avoid the occurrence of irregular deformations, in particular near the transition of the cylinder wall and the covers. Such deformations could actually disturb the regularity of the movement of the piston. Four hydrostatic bearings are provided on the cylindrical piston surface, each consisting of a pressure chamber 41 which communicates with the space 40 through a prerestriction 42. This prerestriction is proportioned so that a pressure equal to $P_s/4$ would adjust in the chamber 41 as result of the flowing away of the oil out of the chambers along the gap between the piston and the cylinder to the groove 43 if said groove would communicate with the atmosphere as in the motor shown in FIG. 1. In the linear hydromotor shown in FIG. 2, however, the groove 43 communicates with a pressure-regulating mechanism 50 through a duct 44 drilled in the piston 41, which mechanism is incorporated centrally in the piston and is shown diagrammatically on a larger scale in FIG. 3. It consists mainly of a cylindrical housing 51 and a valve 52 axially movable therein. The duct 44 opens into the aperture 53 of the housing 51 at the area where a groove 54 is situated between two parts 55 and 56 of the value 52. Four gaps 57 are furthermore milled in the part 56 and extend in the axial direction beginning near groove 54 and extending to approximately the center of the part 56. In the position shown they extend just to the left-hand edge of an annular groove 58 which is recessed around the part 56 of the valve in the inner wall of the housing 51. This groove comprises an outlet 59 which, as shown in FIG. 1, continues through the piston body 31 to the interior of the piston rod 38 and subsequently through an aperture 60 to the atmosphere of pressure $P_o=0$. Dependent upon the position of the valve 52 the passage of the gaps 57 to the groove 58 will be more or less closed. This position is determined by two reference pressures. The first is that of the oil in a groove 61 provided in the cylindrical piston surface between the pressure chambers 41 and the space 62 behind the piston. The pressure $P_k$ in this groove corresponds to the average pressure in the chambers 41 and is transferred, through a duct 63 drilled in the piston, to the left-hand end of the housing 51 of the pressure-regulating mechanism (FIG. 3). The other reference pressure is the supply pressure $P_s$ which is transferred to the right-hand side of the housing 51 from the space 40 in front of the piston, through a duct 64. In the equilibrium condition these pressures are inversely proportional to the size of the side surfaces of the piston 31 on which they act. The end faces 66 and 67 of the valve 52 are chosen to be such that they are in the same proportion as the side faces 36 and 37 of the piston 31, i.e., 2:1. When the pressure $P_k$ in the chambers 41 becomes too high, the valve 52 will move to the right as a result of which the passage of the groove 54 through the gaps 57 to the groove 58 is increased and the removal of the oil out of the chambers 41 is promoted. In the manner an inadmissibly high pressure behind the piston is prevented.

It is of importance in various applications of a hydromotor, for example, in controlling machine tools, to fix the piston and the piston rod very accurately in a given position. It is endeavored to prevent deviations larger than 0.1 μm. In order to enable such accurate positioning a sleeve 70 is secured to the front cover 35 of the cylinder, the inner surface of said sleeve which faces the piston rod 38 being profiled so that it can perform two functions. In the first place the parts 71, 72 and 73, 74 respectively, form two stepped bearings the parts 71 and 73 of which, which are slightly wider than the parts 72 and 74, serve as prerestrictions for the parts 72 and 74 which act as pressure chambers, but the parts 71 and 73 themselves also serve partly as pressure chambers. In the inner surface of the sleeve two grooves 75 and 76 are milled laterally of a rather wide part of the sleeve 77 which closely fits the piston rod without, however, inhibiting the movement thereof in the relaxed condition. The grooves 75 and 76 both communicate with a duct 78 which can be closed or opened at 79. In closed condition the oil pressure inside and outside the sleeve will be equal in which case the piston rod is free to move. However, when the valve 79 is opened the oil pressure between and in the proximity of the grooves 75 and 76 will fall off and the part 77 of the sleeve will be forced between the grooves around the piston rod as a result of the oil pressure $P_s$ which is operative on the outer surface of the sleeve. It is to be noted that the width of the gaps between the sleeve and the piston rod is strongly exaggerated in the drawing. The elastic deformation of the sleeve as a result of the oil pressure $P_s$ is facilitated by the presence of a groove 80 in the outer surface of the sleeve around the part 77 so that at that area the wall thickness of the sleeve is smaller than beside it. Furthermore it is to be noted that if the groove 76 would be omitted a clamping of the sleeve would be possible also with the groove 75 alone.

Figure 4:
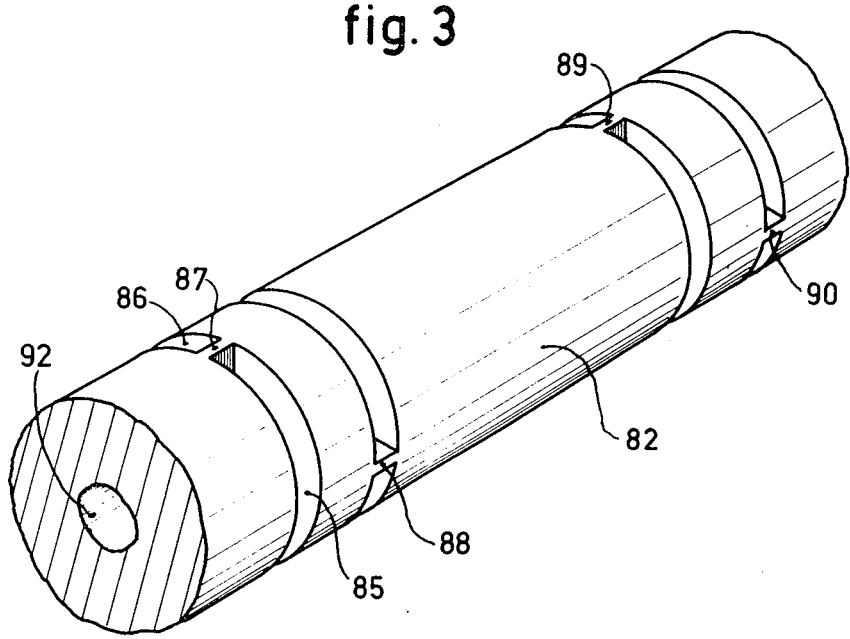
FIG. 4 is a diagrammatic perspective elevation of the universal joint used in said motor.

Although the large rigidity of the bearing of the hydromotor described presents great advantages, it necessitates in some cases a very careful mounting when, for example, the hydromotor is to be incorporated in a high-precision machine tool. In order to simplify a matching of the motor to its field of application, the fact that a comparatively large amount of space is available within the piston rod 38 is used to provide the piston with a double universal joint 82 which extends up to the end of the hollow piston rod 38 and is provided there with a closing plate 84 by means of bolts 83, which plate seals and end of the piston rod 38. The universal joint consists of a rod, see FIG. 4, in which near each end at right angles to the axis two pairs of slits 85 and 86 are milled in such manner that between each pair of slits only a thin flexible wall remains. These walls are denoted by the reference numerals 87, 88 and 89, 90, respectively. Each pair of walls is rotated through 90° relative to each other as a result of which two universal joints are formed. The bends of the universal joint need only be extremely small so that the displacement which the closing plate 84 makes with respect to the end of the hollow piston rod 38 can also be very small. The closing plate can displace a little in the transverse direction across the end of the piston rod, a sealing ring 91 preventing the loss of oil. A central bore 92 is provided in the universal joint through which bore a tube 93 is passed which may serve to conduct oil under a pressure of $P_s$ to the end of the piston rod 38 and the closing plate 84 where said oil may be used for driving tools which are secured to the end of the piston rod.

Of course many other embodiments are possible without departing from the scope of this invention, particularly in as far it concerns, for example, the construction of the pressure-regulating mechanism, the bearing of the piston rod or the construction of the cylinder In both embodiments shown the piston was provided with a single piston rod. Of course, the piston might as well be provided with piston rod on both sides when the application of the linear hydromotor would make such desirable.

What is claimed is:

1. A linear hydromotor comprising a cylinder body, a piston axially movable within said cylinder, said piston having two flat surfaces and a cylindrical surface, first and second end covers closing each end of said cylinder, a piston rod attached to said piston at one of said flat surfaces and extending axially within said cylinder and through said second end cover so as to be hermetically sealed but linearly movable within said cylinder, a first end space formed between one of said flat surfaces of said piston and said first end cover, a second end space formed between the other flat surface and said second end cover, means communicating with said second end space for supplying fluid medium under pressure thereto so that said pressure acts on one of the end faces of said piston duct mans communicating with said first end space for either supplying fluid medium under pressure to said first end space or connecting said first end space with the atmosphere, a plurality of pressure chambers regular circumferentially distributed on and about the cylindrical surface of said piston for hydrostatically journaling said piston within said cylinder, plurality of narrow ducts within said piston, each narrow duct communicating between a respective chamber said second end space so that fluid medium is thereby supplied to said chambers so as to form hydrostatic bearing means, a prerestriction within each of said narrow ducts for producing a resistance to fluid flow, a circumferential groove provide on the cylindrical surface of said piston and located between said pressure chambers and said second end space, and further duct means within said piston and rod communicating between said groove and the atmosphere, a gap between said piston and said cylinder connecting the bearing chambers with said groove, said prerestrictions and said gap between said piston and said cylinder connecting the bearing chambers with the said groove being proportioned so that the pressure within said chambers equalizes with the pressure in such first end space.

2. The linear hydromotor according to claim 1 wherein the surface area of the piston flat surface to which said piston rod is attached is half that of the other piston area.

* * * * *

PO-1050
(5/69)

UNITED STATES PATENT OFFICE
CERTIFICATE OF CORRECTION

Patent No. 3,631,766            Dated January 4, 1972

Inventor(s) HILLEBRAND JOHANNES JOSEPHUS KRAAKMAN

It is certified that error appears in the above-identified patent and that said Letters Patent are hereby corrected as shown below:

IN THE CLAIMS

Claim 1, line 13, "piston duct mans" should be --piston, duct means--;

line 19, before "plurality" should be --a--.

Signed and sealed this 13th day of November 1973.

(SEAL)
Attest:

EDWARD M. FLETCHER, JR.          RENE D. TEGTMEYER
Attesting Officer                  Acting Commissioner of Patents